United States Patent [19]
Balz et al.

[11] Patent Number: 5,996,985
[45] Date of Patent: *Dec. 7, 1999

[54] COMPONENT RETAINER

[75] Inventors: James Gregory Balz, Maybrook; Mark Joseph LaPlante, Walden; David Clifford Long, Wappingers Falls; Brenda Lee Peterson, Wappingers Falls; Donald Rene Wall, Wappingers Falls, all of N.Y.

[73] Assignee: International Business Machines Corporation, Armonk, N.Y.

[ * ] Notice: This patent is subject to a terminal disclaimer.

[21] Appl. No.: 09/111,108

[22] Filed: Jul. 6, 1998

Related U.S. Application Data

[60] Continuation of application No. 08/637,520, Apr. 25, 1996, which is a division of application No. 08/336,957, Nov. 10, 1994, abandoned.

[51] Int. Cl.⁶ .................................................... B23B 31/40
[52] U.S. Cl. ....................... 269/48.1; 269/254 R
[58] Field of Search .................... 269/48.1, 254 R, 269/287; 198/803.01, 803.8, 803.11, 803.15; 211/89; 294/99.1

[56] References Cited

U.S. PATENT DOCUMENTS

| | | |
|---|---|---|
| 725,874 | 4/1903 | Riley . |
| 2,393,587 | 1/1946 | Bugg et al. . |
| 3,030,903 | 4/1962 | Morris . |
| 3,556,507 | 1/1971 | Haskell . |
| 4,059,036 | 11/1977 | Hartley . |
| 4,465,220 | 8/1984 | Ledlow et al. . |
| 4,545,761 | 10/1985 | Cartwright . |
| 4,703,920 | 11/1987 | Grabbe et al. . |
| 4,807,421 | 2/1989 | Araki et al. . |
| 4,928,821 | 5/1990 | Belko, Jr. . |
| 5,007,534 | 4/1991 | Tamaki et al. . |
| 5,090,608 | 2/1992 | Jones . |
| 5,133,939 | 7/1992 | Mahe . |
| 5,244,192 | 9/1993 | Casad . |
| 5,516,086 | 5/1996 | Tankersley . |

*Primary Examiner*—Robert C. Watson
*Attorney, Agent, or Firm*—Delio & Peterson LLC; John J. Tomaszewski; Ira D. Blecker

[57] ABSTRACT

An apparatus for accurately positioning and retaining at least one component, comprising a substantially rigid frame comprising a side having at least one opening therein that is larger in size than the component, a layer of compliant material attached to the side of the frame and having at least one opening therein, the frame opening and the layer opening cooperating to define a component receiving opening sized for receiving the component, said component receiving opening having an inner sidewall having at least a portion thereof consisting of compliant material, the compliant material being in substantially uniform contact with the side of the frame.

16 Claims, 14 Drawing Sheets

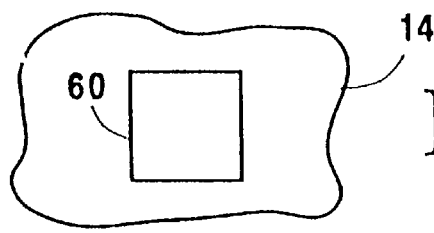
Fig. 11A
Fig. 11B
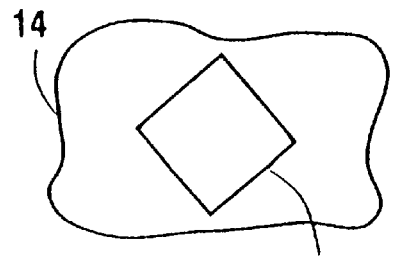
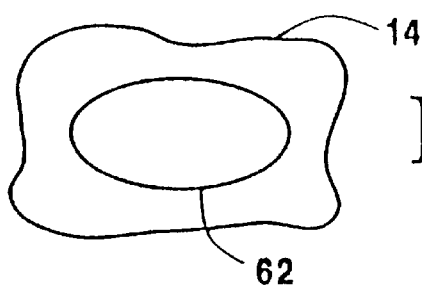
Fig. 11C
Fig. 11D
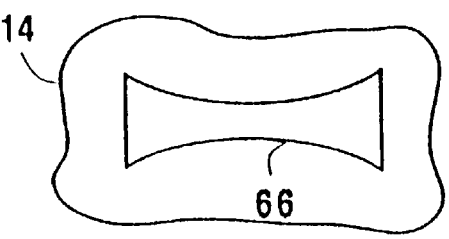
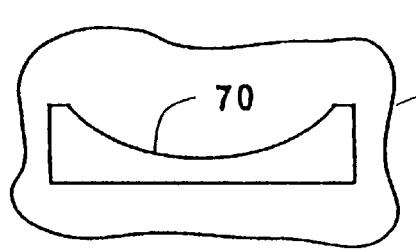
Fig. 11E
Fig. 11F
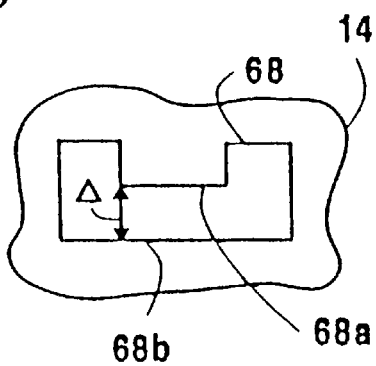
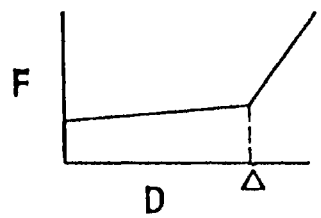
Fig. 11G

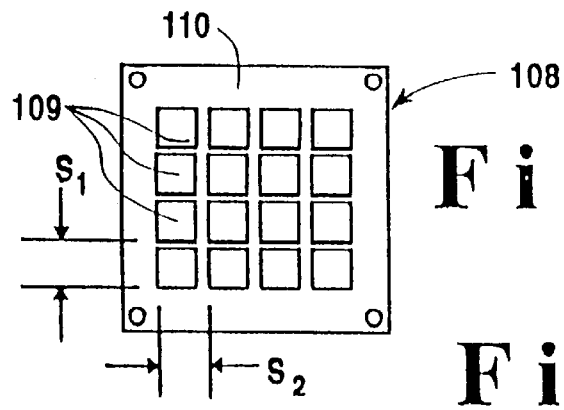
Fig. 13A
Fig. 13B
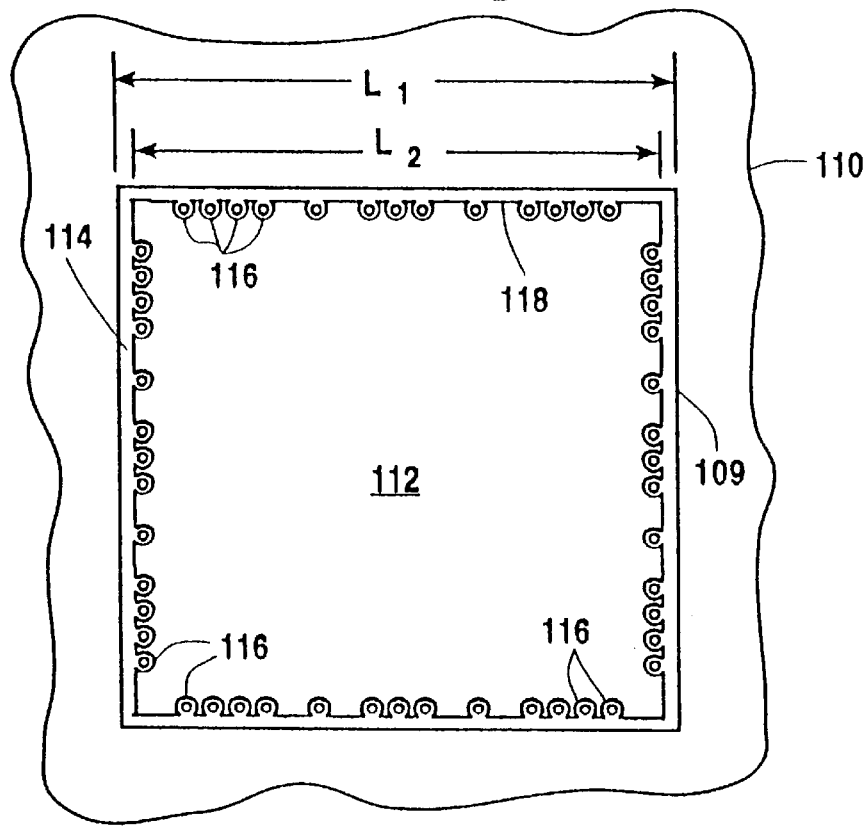
Fig. 13C
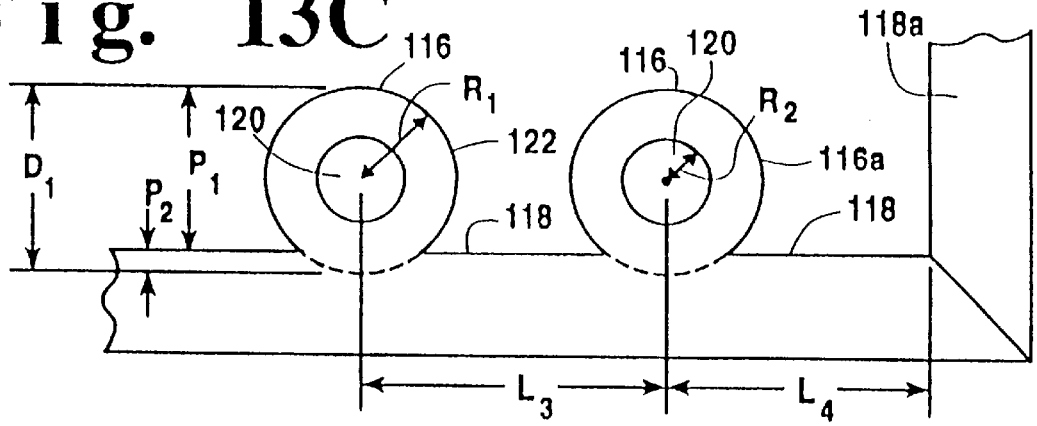

COMPONENT RETAINER

This is a continuation of application Ser. No. 08/637,520 filed on Apr. 25, 1996 which application is a divisional of Ser. No. 08/336,957 filed on Nov. 10, 1994, now abandoned.

BACKGROUND OF THE INVENTION

1. Field of the Invention

The present invention relates generally to a retainer for accurately positioning and retaining components.

2. Problem to be Solved (i) Background and Long-Felt Need

During the manufacture of electronic components, it is sometimes necessary to hold or retain the components as they are processed in one or more operations. In many instances, these operations require light or no contact with the component, such as photographic processing and inspection, laser trimming and machining, and component testing. Another example is screen-printing of many small-sized, identical substrate pieces with identical microelectronic patterns. These patterns must be accurately placed on the substrate pieces within predetermined tolerances. Furthermore, it is essential that the substrate pieces are not scratched, chipped or damaged, or chemically contaminated with foreign particles. Such damage can occur through abrasion or other undesirable contact. Therefore, in many of the aforementioned operations, the component or substrate pieces must be accurately held in the X, Y and Z dimensions within predetermined tolerances. Typically, these tolerances are about 0.001 inch (1 mil). What is needed is a component retainer that can accurately position and retain a substrate piece or component in the X, Y and Z dimensions within tolerances of about 0.001 inch. Furthermore, such a component retainer must be capable of retaining planar components in a manner such that the planar components are flush with the component retainer surface so as to prevent excessive contact between the component and screen-printing equipment. Additionally, it is also essential that such a component retainer can be manufactured at reasonable costs.

(ii) Failure of Others

There have been many attempts to solve the aforementioned problems associated with accurately positioning and retaining components or substrate pieces. One such attempt is the device disclosed in U.S. Pat. No. 5,133,939 (the "'939 patent") which utilizes an elastomeric material, such as rubber, tensively configured completely around the component. The device of the '939 patent is suitable only for retaining cylindrical shaped components and cannot be used to retain components having a planar geometry because it would be difficult to mount the component in the stretched rubber. Furthermore, the stretched rubber is not capable of holding planar-geometry components at constant positions due to the twisting action produced by the rubber. Such twisting action results in the components being retained at random positions that depend on where the components originally engaged the rubber. Additionally, the device of the '939 patent does not preclude movement of the substrate piece or component in the "Z" axis. Furthermore, the device of the '939 patent does not allow for selective modification of the compliance of the rubber in order to bias the component to a specific orientation. Another attempt to solve the aforementioned problems is found in U.S. Pat. No. 5,007,534 (the "'534 patent) which discloses a retainer formed in a rigid metal plate wherein an elastic material is used to retain the components. Only elastic material exists between the retaining holes. There is no frame material between the elastically held components. It has been found that the device of the '534 patent does not exhibit the required accuracy in the placement of the component. This would be evident for example, if oversized parts were placed starting at one end, resulting in the distorted positions of adjacent parts due to the accumulated displacement of the compliant material. Additionally, it would be difficult to process components which vary significantly in size. Since a relatively non-compliant material would be necessary to accurately locate the component, the ability to accommodate relatively large size variations would be precluded. A further attempt to solve the aforementioned problems is found in U.S. Pat. No. 4,928,821 (the "'821 patent) which discloses a fixture for holding electronic components using an elastomeric material that grasps the sides of the component. When the components are inserted into the fixture of the '821 patent, they are forced through and held in place by the gripping action of the tensively configured elastomeric material against the sides of the component. However, the fixture of the '821 patent cannot hold components flush with the fixture surface. Furthermore, the fixture of the '821 patent cannot hold components accurately in the X, Y or Z axis. Additionally, it would be difficult to accurately machine openings in the elasiomeric material used in the '821 patent in part because the elastomeric material is on both outer surfaces of the base plate. This would require separate machining steps on each side. Otherwise, the openings in the elastomeric material layer must be formed before the elastomeric material is attached to the base plate. Other conventional component retaining apparatuses utilize synthetic resins in forming a retaining fixture. However, it is difficult to process synthetic resins to obtain a uniform thickness over the entire area of the synthetic resin layer.

(iii) Objects of the Present Invention

Bearing in mind the problems and deficiencies in conventional retainers, it is an object of the present invention to provide a new and improved component retainer that can accurately position and retain a component in a predetermined position.

It is another object of the present invention to provide a new and improved component retainer that may be utilized with components having a planar geometry and which have a thickness substantially the same as the thickness of the component retainer.

It is a further object of the present invention to provide a new and improved component retainer that substantially reduces excessive component movement in the "Z" axis.

It is another object of the present invention to provide a new and improved component retainer that may be utilized with components of various sizes, or with components with fairly large variations above or below a given nominal size.

It is yet a further object of the present invention to provide a new and improved component retainer that can be manufactured and implemented at a reasonable cost.

Other objects and advantages of the component retainer of the present invention will be apparent to one skilled in the art in light of the ensuing description.

SUMMARY OF THE INVENTION

The above and other objects, which will be apparent to one of skill in the art, are achieved in the present invention which is directed to, in a first aspect, an apparatus for accurately positioning and retaining at least one component, comprising a substantially rigid frame comprising a side and having at least one opening therein, the opening being larger in size than the component, a layer of compliant material attached to the side of the frame and having at least one opening therein, the frame opening and the layer opening cooperating to define a component receiving opening sized for receiving the component, said component receiving opening having an inner sidewall having at least a portion thereof consisting of compliant material, the compliant material being in substantially uniform contact with the side of the frame.

In a related aspect, the present invention relates to an apparatus for accurately positioning and retailing at least one component comprising a substantially rigid frame comprising a side having at least one opening therein, the opening being larger in size than the component; and a layer of compliant material attached to the side of the frame, the layer having at least one opening therein, the frame opening and the layer opening cooperating to define a component receiving opening sized for receiving the component, the component receiving opening having an inner sidewall having at least a portion thereof consisting of compliant material, the compliant material being in substantially uniform contact with the side of the frame, the inner sidewall having a contour comprising a series of inwardly extending protrusions for contact with the component.

In another aspect, the present invention is directed to an apparatus for accurately positioning and retaining at least one component having a hole comprising a substantially rigid base, a layer of compliant material attached to the base and having a top portion, and a substantially rigid plate attached to the top portion of the layer, the plate being no larger than the layer, the layer and the plate cooperating to define a component retaining pedestal sized for insertion into the hole in the component and having an outer sidewall having at least a portion thereof consisting of compliant material, the compliant material being in substantially uniform contact with the base and the plate.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIGS. 7A–7H are partial top plan views of various contour configurations for the inner sidewall of a component receiving opening of the component retainer of the present invention.

FIGS. 11A–F are partial top plan views of various shaped compliancy modifying openings in the compliant layer of the component retainer of the present invention.

FIG. 11G is a graphical representation of the change in compliancy resulting from the opening of FIG. 11F.

FIGS. 13A–C shows one working example of the component retainer of the present invention.

DESCRIPTION OF THE PREFERRED EMBODIMENTS

Figure 1:
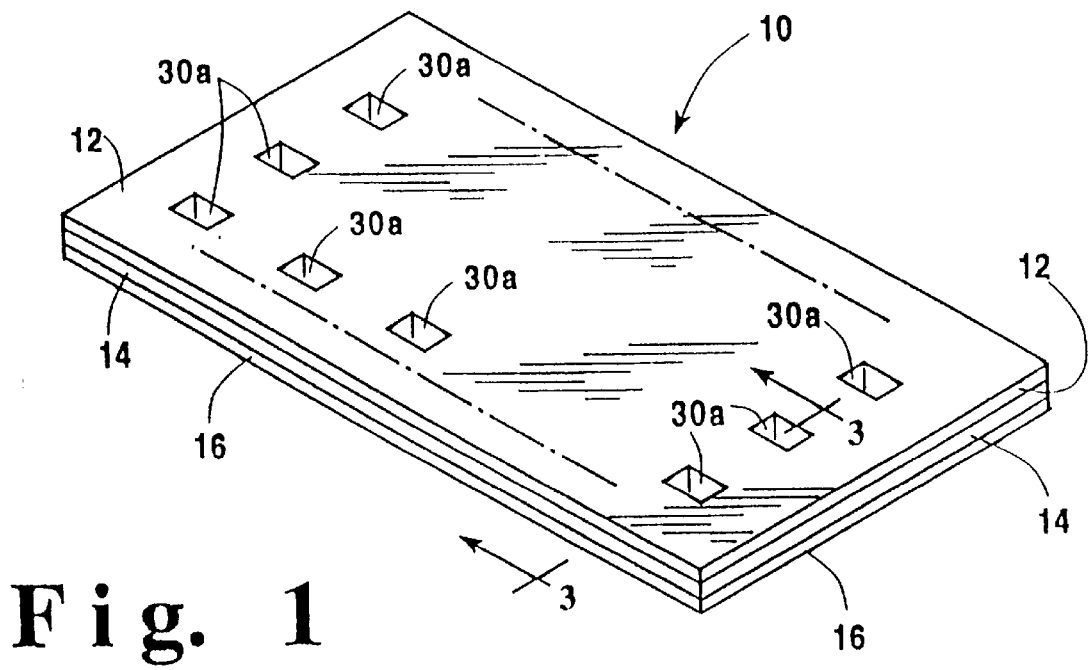
FIG. 1 is a perspective view of the component retainer of the present invention.
Figure 2:
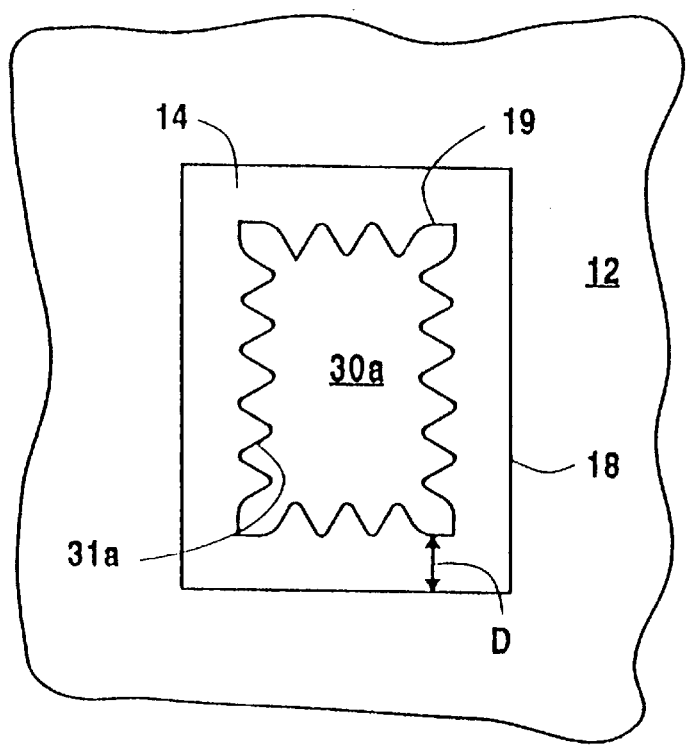
FIG. 2 is a partial top plan view of the component retainer of FIG. 1.
Figure 3:
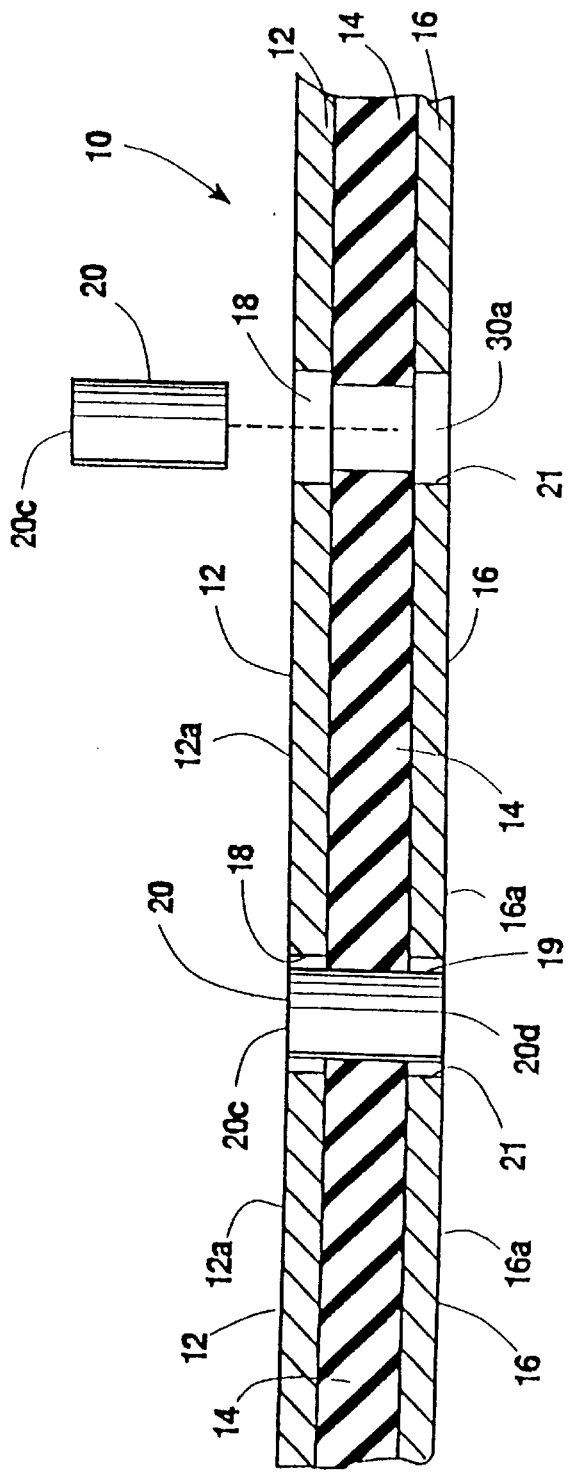
FIG. 3 is a view taken along line 3—3 of FIG. 1.

Referring to FIGS. 1–3, component carrier or retainer 10 of the present invention comprises, in a preferred embodiment, a substantially rigid frame made of top plate 12 and bottom plate 16 and a layer of compliant material 14 disposed between plates 12 and 16. The manner in which layer 14 is disposed between plates 12 and 16 will be discussed in detail below. In a preferred embodiment, plates 12 and 16 are identically constructed and are fabricated from metal. However, any other frame material having substantial rigidity can be used. Compliant material 14 is preferably a pre-formed sheet of silicone rubber that is readily available in a variety of thicknesses and hardnesses. In a preferred embodiment, compliant material 14 is 9255 series silicone rubber manufactured by the CHR Division of the Furon Company of New Haven, Conn. Other types of pre-cured elastomeric materials may also be used, such as silicone foam rubber which is also manufactured by the aforementioned company. Silicone rubber is conducive to providing a uniform thickness throughout the layer 14, unlike synthetic resins, which shrink during the curing process, that are typically used in conventional retaining devices. Furthermore, the thickness and hardness of silicone rubber remains relatively stable over variations in temperature. Pre-formed silicone rubber also ensures that the layer 14 can be measured for uniform thickness prior to being positioned between plates 12 and 16. The choice of compliant material 14 depends on the required compliance, accuracy, and the geometric shape of the substrate piece or component that is to be retained. In a preferred embodiment, the layer of compliant material 14 has a thickness between about 0.01 inch and 0.2 inch, and has a durometer hardness between about 20 and 70 points, inclusive, on the Shore A scale (ASTM D-2240). Preferably, the variation in the thickness and in the durometer hardness of the compliant material layer 14 is +/−0.005 inch and +/−5 points Shore A scale, respectively. However, the thickness and hardness of compliant material 14 depends on the degree of compliance required which may vary with different applications. The thickness and hardness parameters are independently controllable and may be selected for the particular component and application without undue experimentation. In the event that an extremely tall component is to be retained, two (2) component retainers of the present invention separated by an appropriate spacer may be used.

Figure 1A:
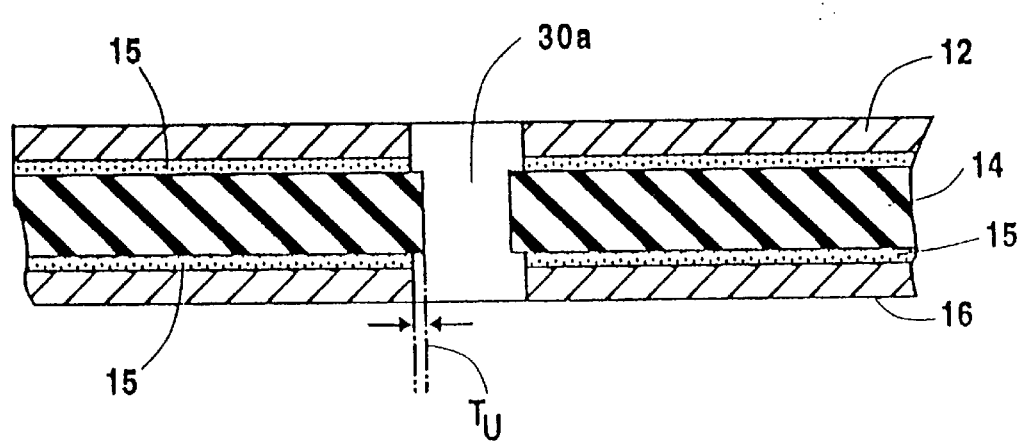
FIG. 1A is a partial cross-sectional view of one embodiment of the component retainer of the present invention showing lamination of the compliant layer.
Figure 1B:
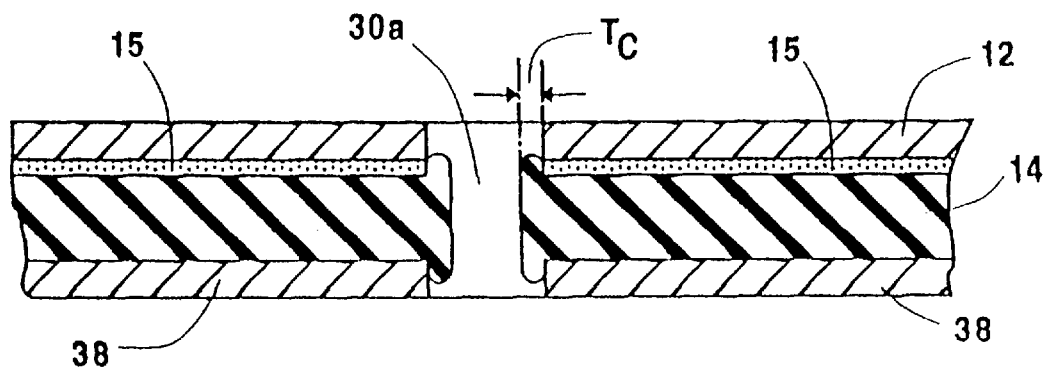
FIG. 1B is a partial cross-sectional view of another embodiment of the component retainer of the present invention showing magnetic compression of the compliant layer.
Figure 1C:
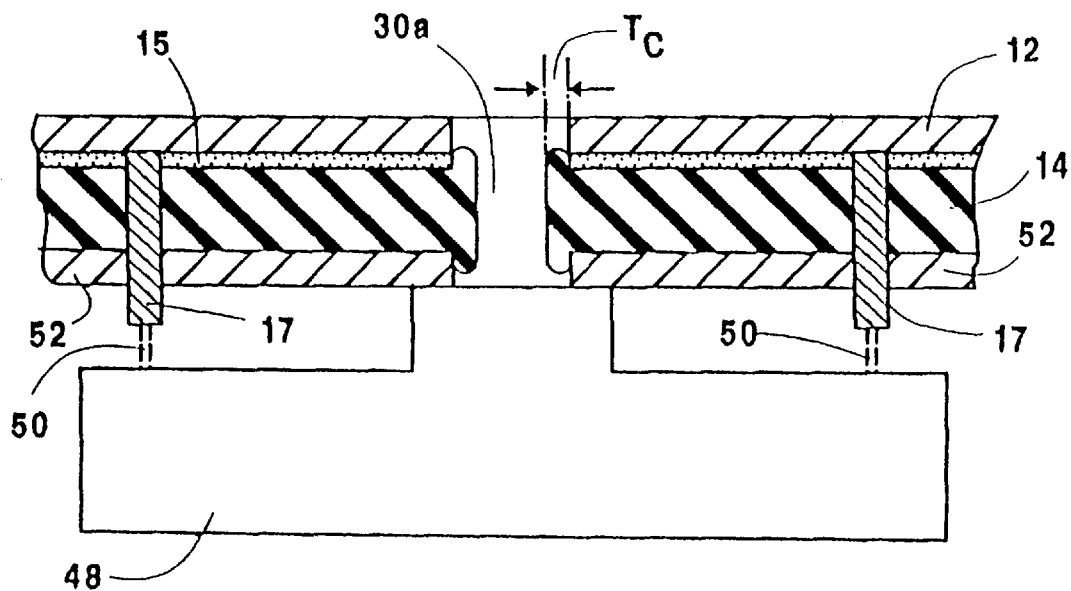
FIG. 1C is a partial cross-sectional view of a further embodiment of the component retainer of the present invention showing one method of mechanical compression of the compliant layer.
Figure 1D:
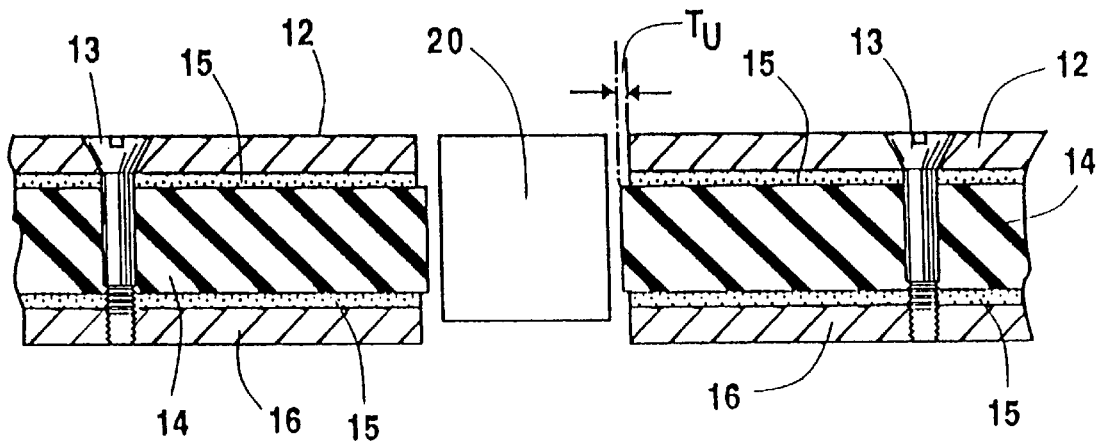
FIGS. 1D and 1E are partial cross-sectional views of another embodiment of the component retainer of the present invention showing another method of mechanical compression of the compliant layer.
Figure 1E:
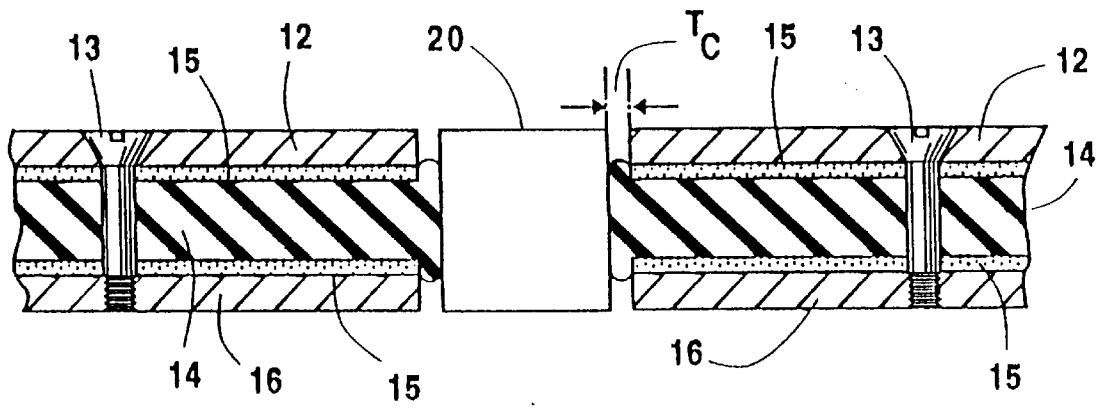

In the present invention, compliant material 14 is maintained in substantially uniform contact with the side of the frame in order to accurately position and retain the component. In a preferred embodiment, the layer of compliant material 14 is disposed between and laminated to plates 12 and 16. In this embodiment (FIG. 1A), preferably, an adhesive 15 is used to attach layer 14 to plates 12 and 16. A suitable adhesive is 3140RTV manufactured by Dow Corning. Preferably, the adhesive coating has a thickness between about 0.001 inch and 0.002 inch, inclusive. Other methods may be used to maintain uniform contact between the compliant material layer and the side of the frame, for example by compressing layer 14 against one or more of plates 12 and/or 16 by magnetic or mechanical compression. For the magnetic compression configuration (FIG. 1B), layer 14 is adhesively attached to plate 12, which must be fabricated from a ferrous metal. A magnet 38 is then positioned on the side of layer 14 that is opposite the side that is attached to plate 12. The force upon plate 12 created by the magnetic field compresses layer 14. In one mechanical compression configuration (FIG. 1C), tabs 17 are attached to plate 12. Layer 14 is adhesively attached to plate 12. A suitable force-producing device, such as a clamp 48, is then engaged with the tabs 17 on plate 12 to pull plate 12 downward, via mechanical connections 50, to compress layer 14 between plate 12 and a suitable planar 52 surface, which can be either operatively associated with or separate from the aforementioned force producing device. In another mechanical configuration (FIGS. 1D and 1E), screws 13 are threadedly engaged with corresponding openings in plates 12, 16 and layer 14 in order to compress layer 14 against plates 12 and 16. $T_U$ represents the protrusion of compliant layer 14 when it is not compressed. $T_C$ represents the protrusion of layer 14 when it is compressed (see FIGS. 1A–1E) and is greater than protrusion $T_U$. The increased protrusion $T_C$ increases the frictional or interfering contact between the inner sidewall of the component receiving opening and the component to retain the component within the component receiving opening. The uniform thickness of compliant layer 14 results in uniform compression of layer 14.

Figure 3A:
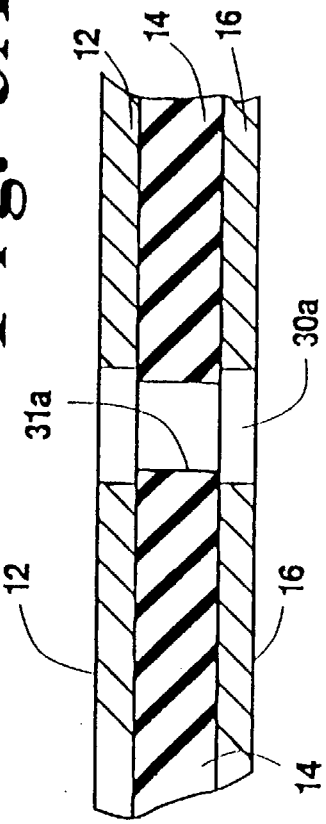
FIG. 3A is partial cross-sectional view, similar to FIG. 3, showing a component receiving opening depicted in FIG. 3.

Referring to FIGS. 2 and 3, plate 12 has openings 18 formed therein at predetermined locations. Plate 16 has openings 21 formed therein at predetermined locations and are aligned or in registry with and have the same dimensions as openings 18. Openings 18 and 21 are larger in size than component 20. Openings 18 and 21 may be of different geometric shapes, depending on the shape of the substrate piece or component to be retained. Compliant material 14 has openings 19 formed therein which cooperate with corresponding openings 18 and 21 to define component receiving openings 30a sized for receiving components 20. Referring to FIG. 3A, each component receiving opening 30a has inner sidewalls 31a. At least a portion of each inner sidewall 31a consists of compliant material 14. In some embodiments described below, the entire inner sidewall consists solely of compliant material. For example, and referring to FIG. 2, the entire inner sidewall 31a of component receiving opening 30a consists of compliant material 14. Thus, the component (not shown in FIG. 2) only contacts compliant material 14 and does' not contact plates 12 and 16.

Portions of each plate 12 and 16 (plate material) surround each opening 18 20 and 21, respectively, to increase the locational accuracy of the component retained as well as the rigidity of the retainer (see FIG. 1). As the distance D between inner sidewall 31a and the perimetrical edge of opening 18 (and of opening 21) decreases, the compliance of layer 14 is reduced which results in tighter control of the component movement. Compliant material 14 that forms inner sidewall 31a has a uniform cross-sectional thickness to ensure high accuracy in the alignment of the component within component receiving opening 30a and repeatability of desired component positional orientation. The contoured portions of the compliant material forming the inner sidewall facilitates accurate positioning of component 20 and prevents the component from contacting plates 12 and 16 or moving out of opening 30a. Thus, the thickness and contour of the compliant material forming the inner sidewall 31a and the frame material surrounding each component receiving opening 31a cooperate to produce accurate placement of components of varying sizes within the component receiving opening 31a and to substantially reduce component movement in the X, Y and Z axes. However, as shown below in other embodiments, openings 19 in layer 14 are formed in a manner to orient component 20 to predetermined positions which may include contact with the edges of plates 12 and 16. Thus, it has been found that the compliancy of the compliant material forming the inner sidewall of the component receiving opening is a function of the: (1) the distance D as described above, (2) the thickness of the compliant material, (3) the type of contour of the compliant material forming the inner sidewalls of the component receiving openings as described below, (4) the type of compliant material utilized, and (5) the degree of compression of the compliant material. As shown in FIG. 3, top surface 20c of component 20 is substantially coplanar with top surface 12a of plate 12. Similarly, bottom surface 20d of component 20 is substantially coplanar with surface 16a of plate 16.

Figure 4:
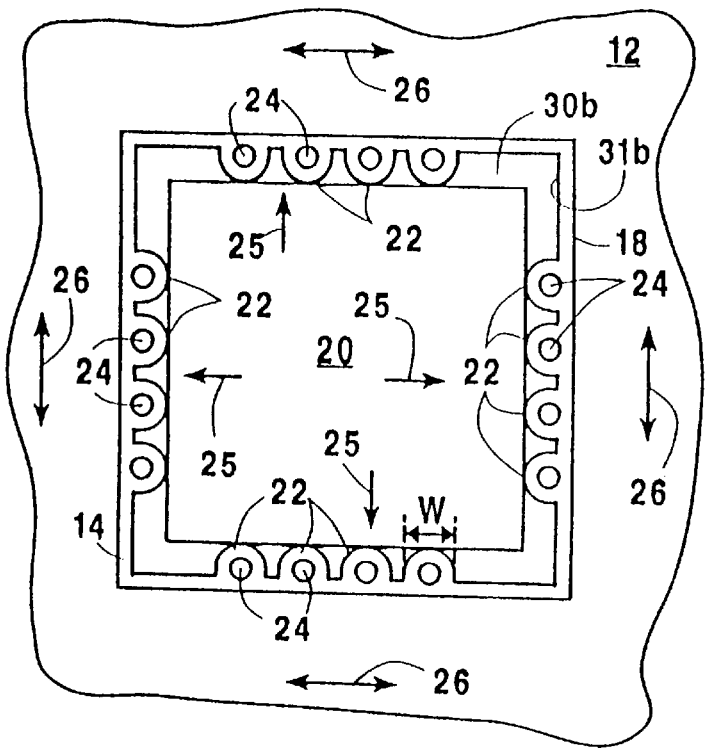
FIG. 4 is a partial top plan view, similar to FIG. 2, of one embodiment of the component retainer of the present invention.
Figure 6A:
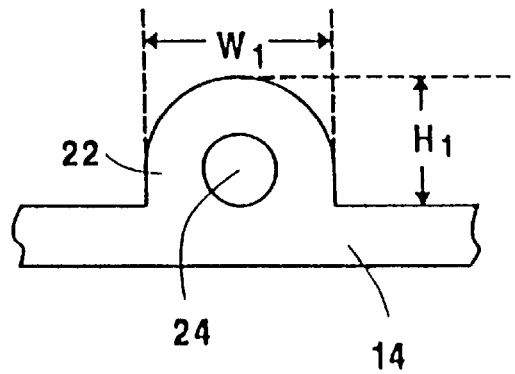
FIG. 6A is a partial top plan view of an uncompressed contoured portion of an inner sidewall of a component receiving opening of the component retainer of the present invention.
Figure 6B:
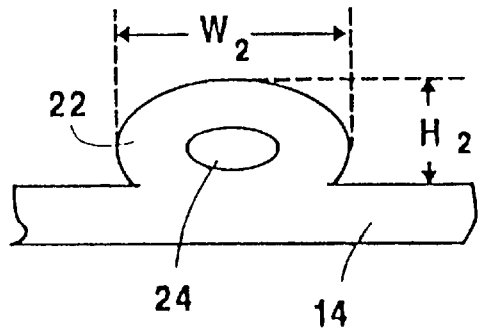
FIG. 6B is a partial top plan view of the contoured portion of FIG. 6A in a compressed state.
Figure 7:
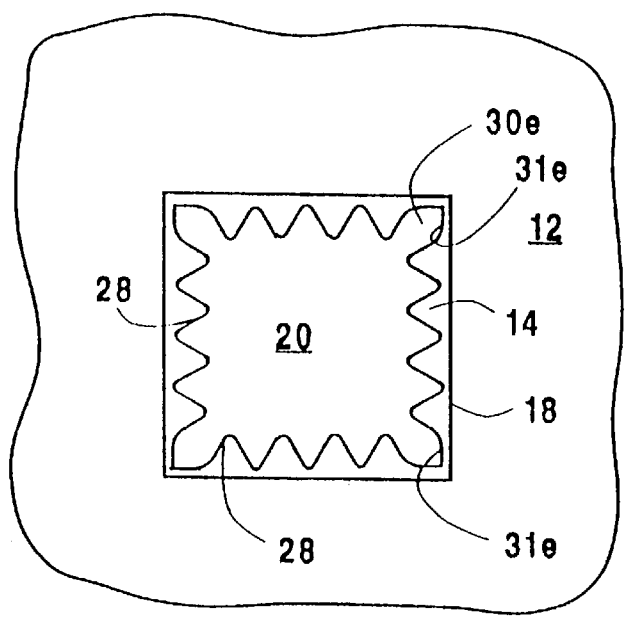
FIG. 7 is a partial top plan view, similar to FIG. 2, of another embodiment of the component retainer of the present invention.
Figure 7A:
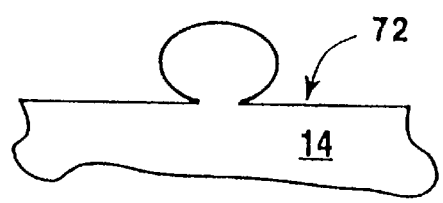
Figure 7B:
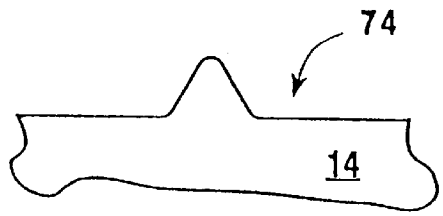
Figure 7C:
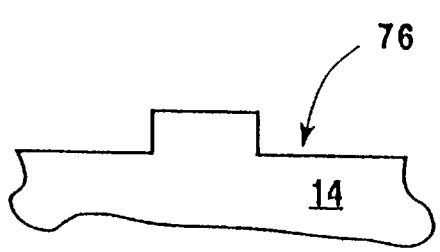
Figure 7D:
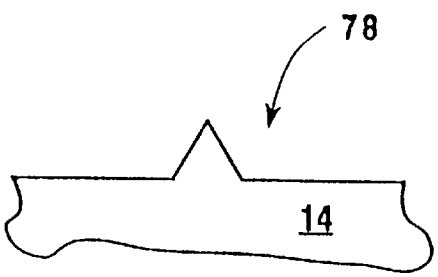

FIGS. 3, 4 and 7 show center-alignment-type embodiments of the component retainer 10 of the present invention wherein component 20 is centered in the component receiving openings without contacting or overlapping plates 12 and 16. Referring to FIG. 4, inner sidewall 31b of component receiving opening 30b consists entirely of compliant material 14 and has inwardly extending contoured portions 22 substantially "doughnut" shaped. During insertion of the component, doughnut shaped portions 22 compress and holes 24 collapse (i.e., become more oval) as indicated by arrow 25 to accommodate variations in dimensions of the component within normal part size tolerances. As a secondary benefit, holes 24 permit the inwardly extending portions 22 to shift laterally or "roll" as indicated by arrow 26 without causing a significant amount of torque thereby precluding distortion of the position of component 20. The movements of doughnut-shaped portions 22 provide the required resiliency when a substrate piece or Component at the nominal size or above is retained in component receiving opening 30b. Referring to FIG. 6A, portion 22 has a width $W_1$ and height $H_1$. There is little compression or movement of doughnut-shaped portions 22 when a component near the lower limit of the part size tolerance is retained in opening 30b. Thus, the width and height of portion 22 is substantially $W_1$ and $H_1$, respectively when a component near the lower limit of the part size tolerance is retained in opening 30b. However, as shown in FIG. 6B, the doughnut shaped portions 22 do exhibit movement when a component near the upper limit of the part size tolerance is retained in opening 30b. The resulting portion 22 has a width $W_2$ that is greater than $W_1$ and a height $H_2$ that is less than $H_1$. In a preferred embodiment, holes 24 have a diameter of about 0.018 inch and each doughnut-shaped portion 22 has a width W of about 0.043 inch. Referring to FIG. 7, inner sidewall 31e of component receiving opening 30e consists entirely of compliant material 14 and has a substantially sinusoidal shaped contour for portion 22. Amplitude 28 is between about 0.10 inch and 0.30 inch peak-to-peak, inclusive. In a preferred embodiment, the amplitude 28 is about 0.20 inch. Other configurations of the inwardly extending contoured portions 22 may be utilized. For example, and referring to FIGS. 7A–7G, inwardly extending contoured portions may have a semi-circular shape 72, a gaussian (haystack) shape 74, a square shape 76, a triangular shape 78, a truncated triangle shape 80, an opposed-flexures configuration 82, an asymmetrical flexure configuration 84 and a 529 (pi) shape configuration 85. Preferably, the various contours of compliant material 14 forming the inner sidewalls of the component receiving openings described above are formed by a laser cutting process implemented after compliant material 14 is inserted between metal plates 12 and 16.

Figure 5:
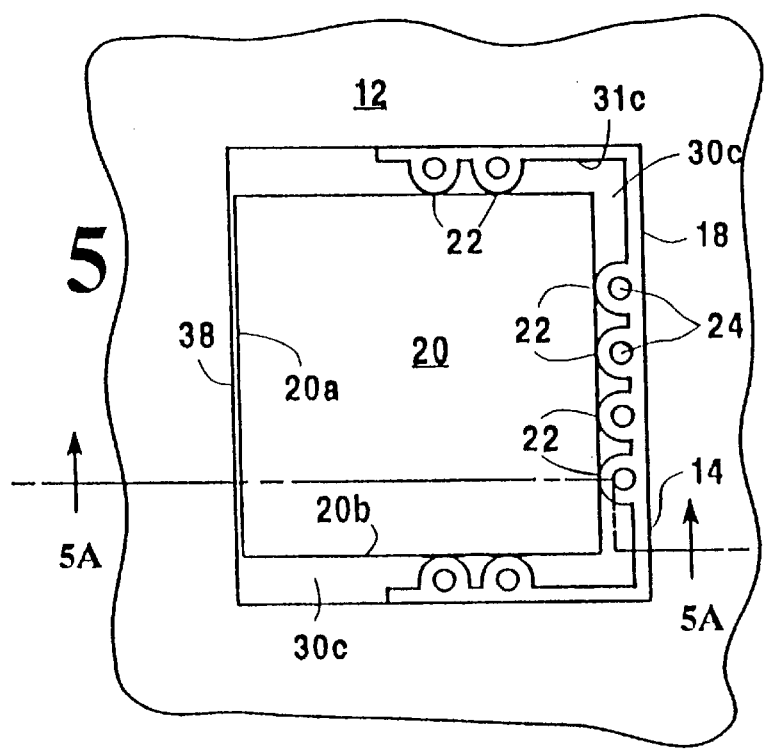
FIG. 5 is a partial top plan view, similar to FIG. 2, of an alternate embodiment of the component retainer of the present invention.
Figure 5A:
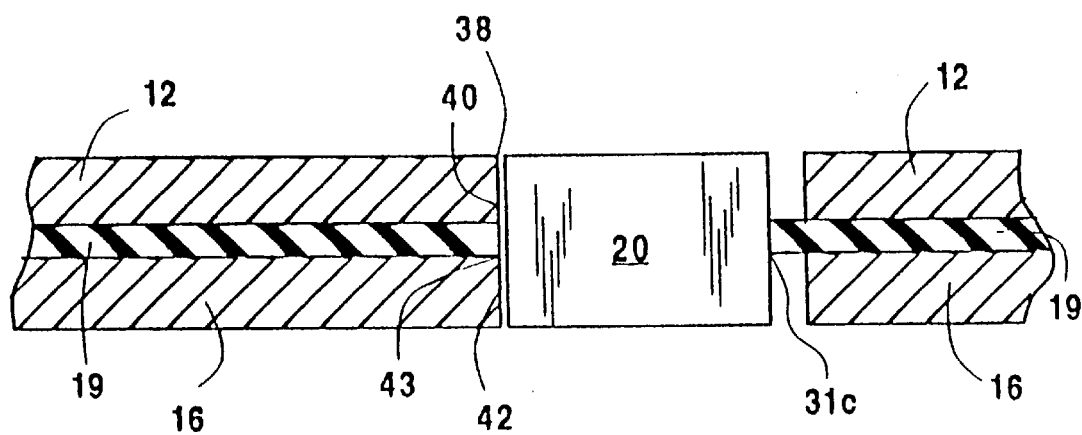
FIG. 5A is a view taken along line 5a—5a in FIG. 5.
Figure 6:
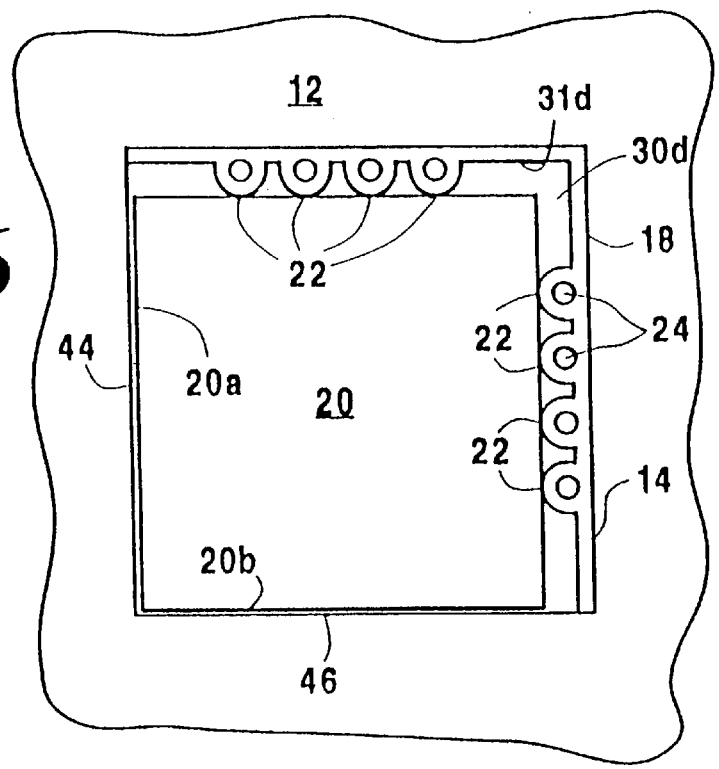
FIG. 6 is a partial top plan view, similar to FIG. 2, of a further embodiment of the component retainer of the present invention.
Figure 9:
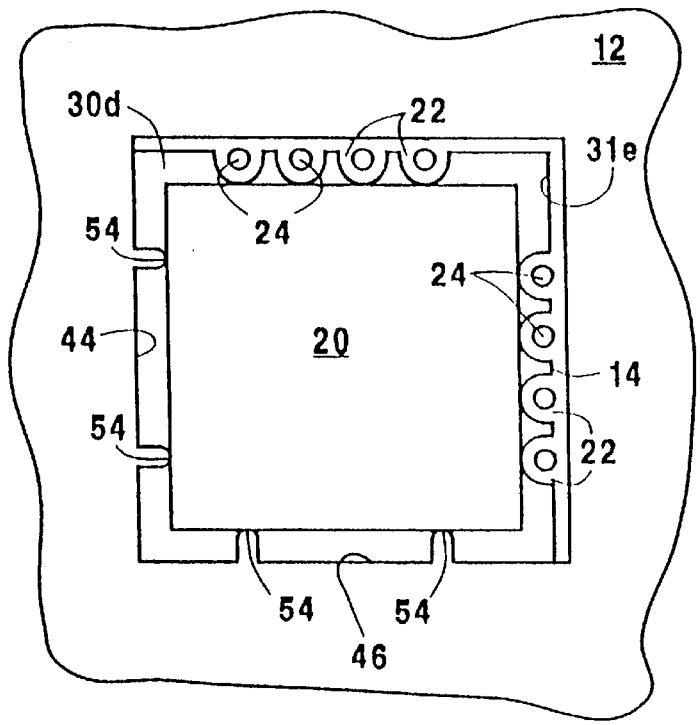
FIG. 9 is a partial top plan view of a further embodiment of the component retainer of the present invention.

FIGS. 5 and 6 show retainer configurations wherein only portions of the inner sidewalls of the component receiving openings consists solely of compliant material 14 to "bank" component 20 against the portions of the inner sidewalls that do not consists solely of compliant material 14. The uniform cross-sectional thickness of compliant material 14 provides the required accuracy for "banking" the component or substrate piece against the portions of the sidewalls that do not consists solely of compliant material 14. FIG. 5 shows an "edge justification" configuration wherein the substantially doughnut-shaped contoured portions 22 position component edge 20a against portion 38 of inner sidewall 31c. Referring to FIG. 5a, portion 38 of inner sidewall 31c does not consists solely of compliant material 14, but is comprised of the edges 40 and 42 of plates 12, 16, respectively, and the layer of compliant material 14. However, edge 43 of the compliant material 14 does not protrude or extend beyond the edges 40 and 42 of plates 12 and 16, respectively. FIG. 6 shows a "corner justification" configuration wherein the substantially doughnut shaped contoured portions 22 position component edges 20a and 20b against portions 44 and 46, respectively, of inner sidewall 31d. Portions 44 and 46 of component receiving opening 30d are identical to portion 38 of component receiving opening 30c shown in FIG. 5a. FIG. 9 shows an alternate embodiment of the "corner justification" configuration of FIG. 6. Contact points or "banking bumps" 54 are formed on portions 44 and 46 of inner sidewall 31 and are comprised of portions of plates 12 and 16. Although FIG. 9 shows portions 44 and 46 as being substantially straight and having only two (2) contact points 54 on each portion, as many contact points 54 as necessary may be used to avoid bistable component placement. For example, three (3) contact points 54 may be utilized, two (2) on portion 44 and one (1) on portion 46. In another example, four (4) contact points 54 are utilized, two (2) on each portion 44 and 46. Contact points 54 may also be utilized with the edge justification configuration of FIG. 5.

Figure 10:
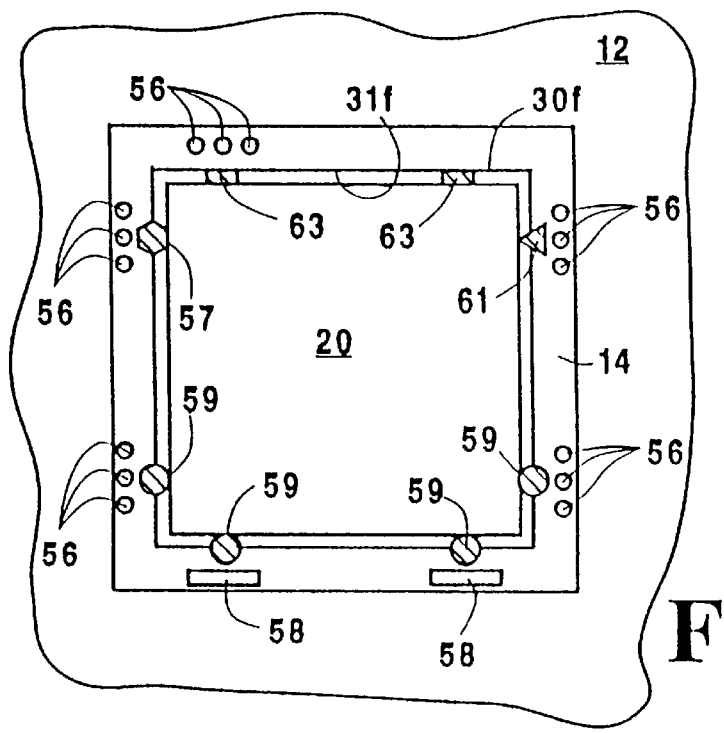
FIG. 10 is a partial top plan view of another embodiment of the component retainer of the present invention.

FIG. 10 illustrates further embodiments of the component retainer of the present invention. Openings of various sizes and shapes are formed at predetermined locations in the compliant material 14 (the top portion of sidewall 31f) in order to modify the hardness or the compliancy of compliant material 14. Although FIG. 10 shows substantially circular and rectangular shape openings 56 and 58, respectively, the openings can have other shapes such as (see FIGS. 11A–F) a substantially square shape 60, oval shape 62, diamond shape 64 and a bow-tie shape 66. Furthermore, a combination of different shape openings may be used. The openings may also be of a shape to achieve a desired degree of hardness or compliancy (stiffness) of layer 14 in a specific manner. For example, opening 68 has a shape that produces a non-linear change in stiffness (hardness). Specifically, when portion 68a contacts portion 68b, the degree of force or hardness is increased. This is illustrated by the graph shown in FIG. 11G which shows a significant increase in the force F (reduced compliancy of compliant material 14) exerted upon the component when portion 68a moves distance $\Delta 0$ contacts portion 68b. FIG. 11E shows opening 70 which exhibits a progressive increase in the stiffness (progressive decrease in compliancy or progressive increase in hardness) of compliant material 14. Referring to FIG. 10, insert contact points or pads 57, 59 and 61 are attached to the inner sidewall 31f of component receiving opening 30f. The inserts facilitate retainment of very abrasive components, facilitate insertion and removal of components into and from, respectively, the component receiving opening, and prevent contamination of component 20. In order to achieve a durable, long lasting insert, the inserts are preferably fabricated from steel, carbide, diamond, plastic, nylon or teflon. The inserts may also be fabricated from an elastomeric material such as soft or hard rubber. The inserts may be adhesively attached into or on compliant layer 14 as shown by inserts 57, 59 and 61. The inserts may also be positioned intermediate component 20 and inner sidewall 31f, as shown by insert contact points or pads 63. Inserts 63 may be adhesively attached to the inner sidewall 31f. Although inserts 57, 59, 61 and 63 are shown as hexagonal, circular, triangular and rectangular, respectively, other shapes may also be utilized.

In order to help align and retain the component and component retainer in the Z axis (normal to the plane of the retainer plates as shown in the drawings), a vacuum chuck or other device may be use which applies sufficient force to maintain the component in position during the particular processing operation.

The embodiments described above are suitable for processes wherein all sides of the substrate piece or component must be exposed for processing. For instance, in order to process the top and bottom sides 20c and 20d, respectively, of component 20 (FIG. 3), the top side or bottom side is processed first and then the retainer 10 is rotated or positioned to process the opposite side. The substrate pieces are then removed from retainer 10, rotated 90 degrees and then re-inserted back into retainer 10. Thus, all sides of the substrate piece or component are processed. The thickness of the compliant material 14 that forms at least part of the inner sidewall of the component receiving opening affects the ease with which components or substrate pieces are retained and removed from the component receiving opening.

Figure 8:
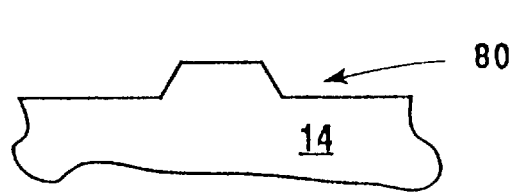
FIG. 8 is a perspective view of a further embodiment of the component retainer of the present invention.
Figure 8:
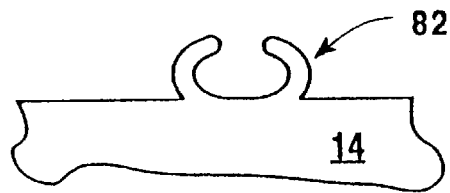
Figure 8:
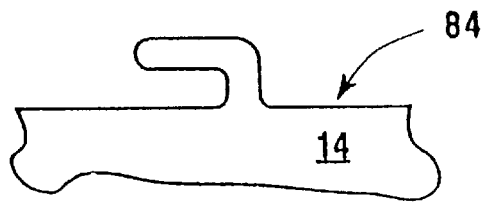
Figure 8:
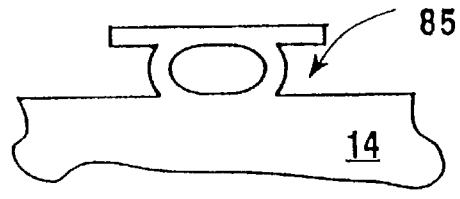
Figure 8:
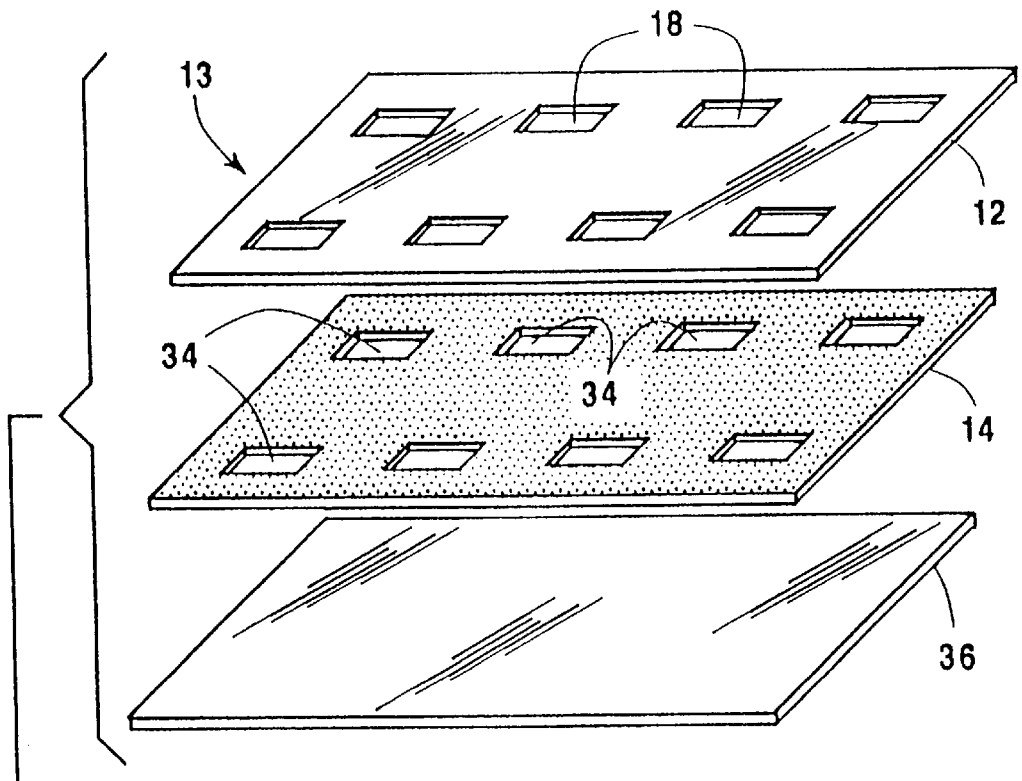

Although the embodiments described above are described in terms of two plates 12 and 16, each of which having openings, and compliant material 14 disposed between plates 12 and 16, the component retainer of the present invention may be realized by retainer 13 shown in FIG. 8 which comprises a frame consisting of plate 12 having an opening 18 therein and a layer of compliant material 14 uniformly secured thereto. Compliant material 14 is attached to plate 12 in a manner as described above. Openings 34 are then formed in layer 14 which cooperate with openings 18 to form a component receiving opening as described above. Plate 36 has no openings formed therein but is used for lamination purposes as described above. Alternatively, openings 34 may be formed before layer 14 is attached to plate 12, or after attachment of plate 36. Where desired, compression may be applied, as described above, to plates 12 and 36 in order to compress compliant material 14. Retainer 13 is suitable for use in processes wherein only one side of a component or substrate piece need be exposed.

In an alternate embodiment, plate 36 has openings that are aligned or in registry with but smaller in size than openings 18 and 34 of plate 12 and layer 14, respectively. In a further embodiment, the stiffness or hardness of the compliant material 14 at different points on the inner sidewall of the component receiving opening may be greater of less than that of other portions of the inner sidewall. For instance, if the inner sidewall of the component receiving opening comprises four (4) perpendicularly intersecting sidewall sections, such as a square or rectangle, then one pair of opposing sidewalls may be formed with compliant material having a first degree of hardness, and the other pair of opposing sidewalls may be formed with compliant material having a second degree of hardness which may be greater than or less than the first degree of hardness. Such a configuration prevents buckling of hollow-construction components.

EXAMPLE NO. 1

Referring to FIGS. 13A–C, a component retainer 110 was constructed to be 8.0 inches×8.0 inches. The thickness of each plate was 0.0035 inch. The thickness of the adhesive between each plate and the compliant material was about 0.001 inch (0.002 inch total), and the thickness of the compliant layer was 0.031 inch. The thickness of entire laminate, the two (2) plates, the compliant material and the adhesive layers was about 0.0040 inch (40 mils). The thickness of the component was about 40 mils. She component had a size of about 33.629 mm +/−0.2 mm square. The compliant material was fabricated from silicone rubber and had a hardness of about 50 points. Component retainer 110 retained 16 components simultaneously ("16-up format"). Each opening in the top and bottom plate was about 35 mm square. (The length of each side of each plate opening is designated by the $L_1$ which was 35 mm). $S_1$ refers to the longitudinal spacing between openings 109 in plate 110 and the bottom plate (not shown) and was about 1.579 inches. $S_2$ refers to the lateral spacing between openings 109 in plate 110 and the bottom plate (not shown) and was about 1.579 inches. Component receiving opening 112 had an inner sidewall 114 which had a contour comprising a series of substantially doughnut shaped portions 116. $P_1$ is the percentage of doughnut diameter $D_1$ that extended above flat base portion 118 of sidewall 114 and was about 75%. $P_2$ is the percentage of diameter $D_1$ that was integral with base portion 118 and was about 25%. Radius $R_1$ was measured from the center of hole 120 to the perimetrical edge 122 of portion 116 and was about 550 µM. Radius $R_2$ is the radius of hole 120 and was about 225 µM. $L_2$ is the distance between the base portions 118 of opposing sidewall sections of inner sidewall 114 and, was about 34.629 mm. $L_3$ is the centerline spacing between doughnut portions 116 and was about 1,200 µM. $L_4$ is the distance between the intersecting sidewall section 118a and doughnut-shaped portion 116a was about 1,000 µM. Silk screening was accomplished to a positional accuracy of +/−1 mil (0.001 inch).

EXAMPLE NO. 2

Figure 14A:
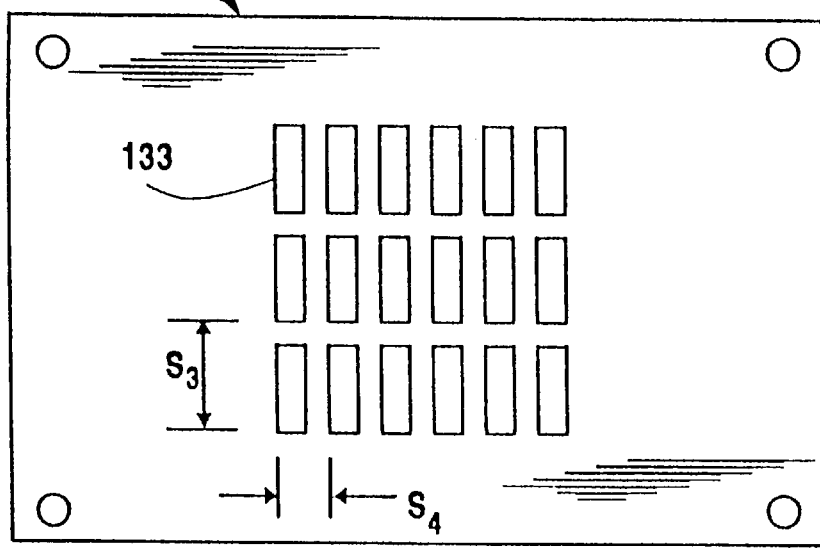
FIGS. 14A–C shows another working example of the component retainer of the present invention.
Figure 14B:
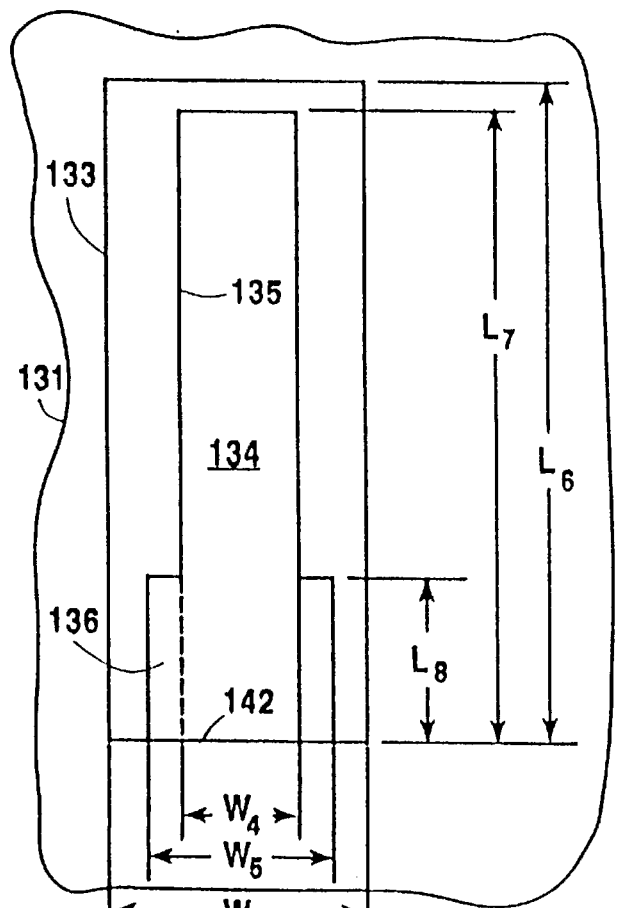
Figure 14C:
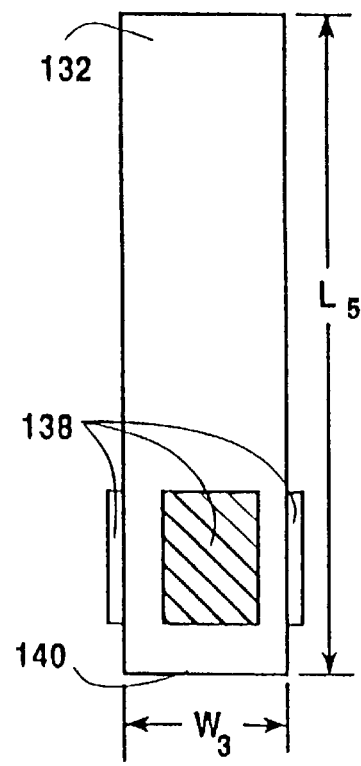

Referring to FIGS. 14A–C, a component retainer 130 was constructed to be 8.0 inches×8.0 inches. The thickness of top plate 131 and the bottom plate (not shown) was 0.006 inch. The thickness of the compliant layer was about 0.054 inch. Each layer of adhesive had a thickness of about 0.001 inch (1 mil). The entire laminate had a thickness of about 0.068 inch (68 mils). The compliant layer had a durometer hardness of about 50 points. Retainer 130 retained 18 components simultaneously. Each component 132 was fabricated from ceramic and was 1778 µM +/−38 µM square. $L_5$ refers to the length of each component 132 which was about 160 µM +/−100 µM. $W_3$ refers to the width of each component 132 (1778 µM +/−38 µM). $L_6$ and $W_6$ referred to the length and width, respectively, of each plate opening and were about 10414 µM and 2260.6 µM, respectively. $L_7$ refers to the length of each component retaining opening 134 and was about 10045.7 µM. Component receiving opening 134 had a width $W_4$ which was about 1730.6 µM. Portion 136 of component receiving opening 134 had a width $W_5$ which was 2006.6 µM and was greater than width $W_4$. $L_8$ refers to the length of the widened portion 136 and was about 4241.8 µM. Portion 136 permits 90° rotation of component 132 without contact between screen patterns 138 of component 132 and inner sidewall 135 of component receiving opening 134. Inner sidewall 135 had a substantially flat contour. Component 132 was edge justified such that component edge 140 contacted portion 142 of inner sidewall 135. Portion 142 consisted of plate 131, the bottom plate (not shown) and the compliant layer. $S_3$ represents the longitudinal spacing of each plate opening 133 and was about 11298 µM. $S_4$ represents the lateral spacing between each plate opening 133 and was about 6350 µM. Silk screening was accomplished to a positional accuracy of +/−1 mil (0.001 inch).

In general, the substantially rigid plate material that surrounds each opening in the retainer provides precise global alignment between the components themselves whereas the compliant material that forms the inner sidewall of the component receiving opening provides precise local alignment of components within the opening to account for variations in size above or below nominal size or within normal production tolerances. In the present invention, and unlike certain prior art devices, errors or variations in size of individual components do not accumulate to affect global alignment of the components. In other words, if one or more individual components are over- or under-sized to a significant degree, the location and alignment of other components are not shifted. The thickness of the laminated structure can be varied depending on the particular application i.e., the size and shape of the component to be retained. Thus, the component retainer of the present invention may be configured to have a thickness substantially the same as the planar components to be retained to ensure that the components are coplanar with the retainer, i.e. the component top and bottom surfaces are flush with the retainer surfaces. Therefore, the laminated component retainer may comprise more than three (3) layers in order to achieve the desires thickness. Additionally, the compliant material of the inner sidewall of the component receiving opening may be contoured to minimize the amount of compliant material that actually contacts the substrate piece. Furthermore, the retainer of the present invention may be constructed without compressing the compliant material. Whether compression is utilized depends on the application and the desired accuracy in positioning the substrate piece within the component receiving openings. If compression is not utilized, then the compliant material is supported in a manner such that it uniformly contacts the surfaces of the two plates. [Furthermore, although doughnut or semi-circular, sinusoidal and flat contours of the compliant material forming the inner sidewall have been described above, other contour shapes may be utilized such as triangular, rectangular or square.]

Figure 12A:
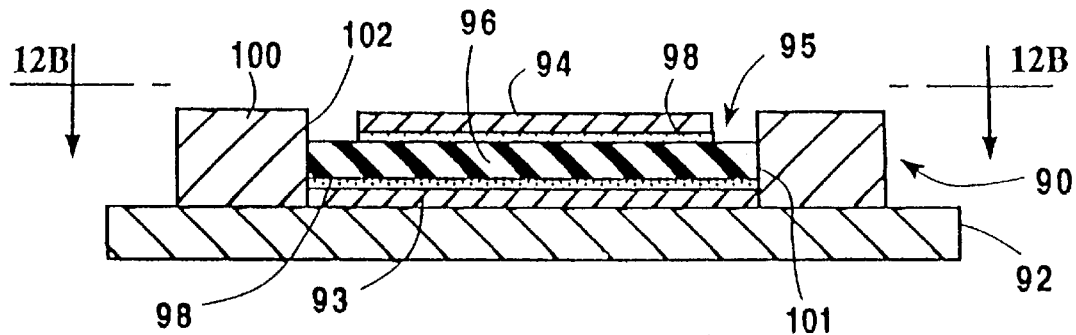
FIG. 12A and 12C are partial cross-sectional views of further embodiments of the component retainer of the present invention.
Figure 12B:
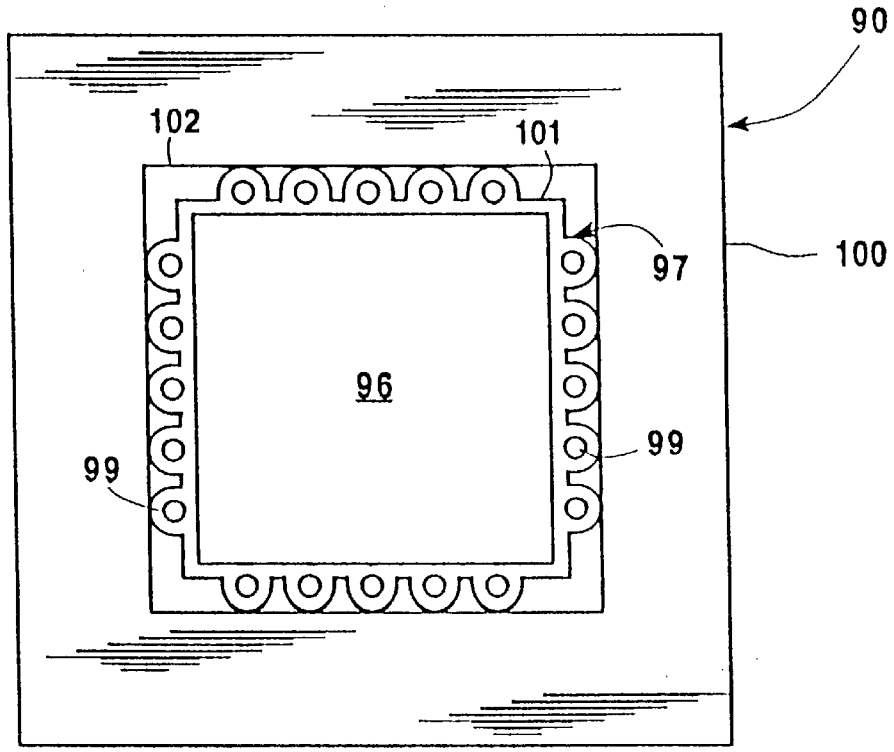
FIG. 12B is a top plan view taken along line 12B—12B of FIG. 12A.
Figure 12C:
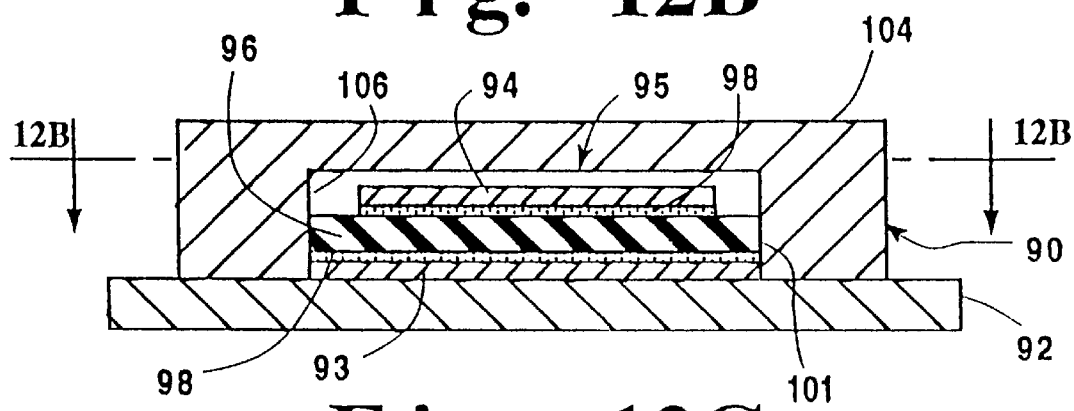

A further embodiment of the component retainer of the present invention is shown is FIGS. 12A–C. Component retainer 90 is designed to retain components having through-holes such as component 100 or blind holds or cavities, such as component 104. Component retainer 90 comprises substantially rigid base plate 92 and component retaining pedestal 95 which is attached to plate 92. Pedestal 95 comprises a layer of compliant material 96, which is fabricated from the same material as compliant material layer 14 described above, substantially rigid bottom and top plates 93 and 94, respectively. Bottom and top plates 93 and 94, respectively, are adhesively attached to compliant layer 96 by adhesive layers 98 in the same manner as described above for plates 12, 16 and layer 14. Bottom plate 93 is rigidly attached to base 92. Preferably, plates 92, 93 and 94 are fabricated from metal. Pedestal 95 has an outer sidewall having at least a portion thereof consisting of compliant material. FIG. 12B shows pedestal 95 wherein the entire outer sidewall 101 consists of compliant material 96. Doughnut shaped portions 97 extend outwardly from outer sidewall 101. Holes 99 are similar to and use for the same purpose as holes 24 described above. FIG. 12A shows retainer 90 retaining component 100 which has through-hole 102. Through-hole 102 receives pedestal 95. FIG. 12C shows pedestal 95 positioned within cavity or blind hole 106 of component 104. Although the doughnut-shape contour is shown, other shape contours discussed above can also be utilized. Pedestal 95 may be compressed by any of the methods described above. If magnetic compression is utilized, top plate 94 must be fabricated from a ferrous metal, and base and bottom plates 92 and 93, respectively, must be fabricated from a non-ferrous metal so as not to interfere with the magnetic field pulling top plate 94 downward. Doughnut shaped portions 97 are sized to allow pedestal 95 to be inserted into the holes of the components. Similar to the embodiments described above, portions 97 have a size sufficient to achieve a frictional or interference-type contact with component 100 with little or no compression. This makes the component easier to insert into the component receiving opening. The friction or interference increases as compliant material 96 is compressed since the protrusion of the compliant layer 96 of the outer sidewall increases during compression. Although it is preferred to utilize plate 93, retainer 90 may be implemented without plate 93. In such a configuration, compliant material 96 is directly attached to base plate 92.

The retainer of the present invention attains the aforementioned objects through the following features:

(a) Self Alignment: Components of substrate pieces may be centered, corner justified or edge justified within the component receiving opening of the retainer.

(b) High Compliance and Adjustability Thereof: The uniform thickness and the various contours of the compliant material that forms the inner sidewall of the component receiving openings facilitate accurate positioning of components of various geometric shapes within the component receiving openings while still maintaining the desired justification.

(c) High Accuracy and Repeatability: The portions of each plate that surround the component receiving openings increase the locational accuracy of the component retained as well as the rigidity of the entire component retainer even when processing components in a "multi-up" format. Components may be successively positioned within component receiving openings within tolerances of +/−0.001 in. regardless of normal variation in component size. The vacuum chuck or other alignment device provides precise retention in the Z axis. Furthermore, the various contours of the compliant material forming the inner sidewalls of the component receiving openings facilitate highly accurate placement of the component in the X, Y and Z axes and substantially precludes movement of the component in the Z axis once the component is positioned in the component receiving opening.

(d) Simplicity in Fabrication and Use: The component receiving opening of the present invention may be manufactured via existing laser technology and from readily available materials. The design of the component retainer of the present invention facilitates insertion and removal of components into and from, respectively, the component receiving openings. Furthermore, the retainer of the present invention may be utilized with existing processing and manufacturing equipment without making modifications to such equipment.

(e) Access to Component Sides/Components Handled Less: The embodiments described above provide exposure to both component sides without handling the component. The component carrier or retainer need only be rotated to allow the underside of the component to be treated. Thus, the component is handled less thereby reducing the risk of damage or contamination to the component.

(f) High Volume Processing of Substrate Pieces or Components: The retainer of the present invention may be utilized in a "multi-up" configuration wherein a large number of substrate pieces or components may be processed simultaneously, and wherein the components are held flush (coplanar) with the surface of the retainer. Thus, the retainer of the present invention provides a cost effective device for use in processing large quantities of microelectronic components.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. An apparatus for accurately positioning and retaining at least one component having a hole, comprising:
   a component having a hole;
   an apparatus containing:
      a substantially rigid base larger than the diameter of the hole;
      a layer of compliant material attached to said base and having a top portion; and
      a substantially rigid plate attached to said top portion of said layer, said plate being no larger than said layer, said layer and said plate cooperating to define a compressible component retaining pedestal sized for insertion of said layer and said plate into the hole in the component with said base contacting the surface of the component and said layer having an outer sidewall having at least a portion thereof consisting of compliant material, said compliant material being in substantially uniform contact with said base and said plate wherein, in operation, said compliant material is compressed while inserted in the hole in the component.

2. The apparatus of claim 1 further including a support for compressing said compliant material against said plate.

3. The apparatus of claim 1 wherein substantially the entire outer sidewall consists of said compliant material.

4. The apparatus of claim 1 wherein said compliant material of said outer sidewall has a substantially sinusoidal contour.

5. The apparatus of claim 1 wherein the combined thickness of said component retaining pedestal is substantially the same as the thickness of the component.

6. The apparatus of claim 1 wherein said compliant material is chosen from silicone rubber or foam rubber.

7. The apparatus of claim 1 wherein the component hole is a through-hole.

8. The apparatus of claim 1 wherein the component hole is a cavity.

9. An assembly of a component having a hole and an apparatus for accurately positioning and retaining the component comprising:
   a component having a hole;
   an apparatus comprising:
      a substantially rigid base larger than the diameter of the hole;
      a layer of compliant material attached to said base and having a top portion; and
      a substantially rigid plate attached to said top portion of said layer, said plate being no larger than said layer, said base, said layer and said plate cooperating to define a component retaining pedestal sized for insertion of said layer and said plate into the hole in the component with said base contacting the surface of the component and said layer having an outer sidewall having at least a portion thereof consisting of compliant material, said compliant material being in substantially uniform contact with said base and said plate.

10. The assembly of claim 9 further including a support for compressing said compliant material against said plate.

11. The assembly of claim 9 wherein substantially the entire outer sidewall consists of said compliant material.

12. The assembly of claim 9 wherein said compliant material of said outer sidewall has a substantially sinusoidal contour.

13. The assembly of claim 9 wherein the combined thickness of said compliant material and said plate of said component retaining pedestal is substantially the same as the thickness of the component.

14. The assembly of claim 9 wherein said compliant material is chosen from silicone rubber or foam rubber.

15. The assembly of claim 9 wherein the hole in the component is a through-hole.

16. The assembly of claim 9 wherein the hole in the component is a cavity.

* * * * *

UNITED STATES PATENT AND TRADEMARK OFFICE
CERTIFICATE OF CORRECTION

PATENT NO. : 5,996,985
DATED : December 7, 1999
INVENTOR(S) : Balz et al.

It is certified that error appears in the above-identified patent and that said Letters Patent is hereby corrected as shown below:

Column 6, line 22, After "opening 18" delete "20".

Column 9, line 55, delete "She" insert therefor - - The - - .

Signed and Sealed this

Eighth Day of August, 2000

Attest:

Q. TODD DICKINSON

*Attesting Officer*    *Director of Patents and Trademarks*